United States Patent [19]
Bamberger et al.

[11] Patent Number: 5,687,951
[45] Date of Patent: Nov. 18, 1997

[54] DRAIN VALVE

[75] Inventors: Michael Bamberger, Gailingen, Germany; Erasmao Porfido, Schaffhausen, Switzerland

[73] Assignee: Georg Fischer Management AG, Schaffhausen, Switzerland

[21] Appl. No.: 514,395

[22] Filed: Aug. 11, 1995

[30] Foreign Application Priority Data

Aug. 11, 1994 [DE] Germany .................. 44 28 453.5

[51] Int. Cl.⁶ .................................................. F16K 51/00
[52] U.S. Cl. .......................... 251/145; 251/333; 251/366
[58] Field of Search ............................. 251/145, 146, 251/318, 319, 320, 321, 322, 324, 144, 368, 366, 333

[56] References Cited

U.S. PATENT DOCUMENTS

| | | | |
|---|---|---|---|
| 2,710,594 | 6/1955 | Thompson | 251/321 X |
| 3,634,167 | 1/1972 | Plontke | 156/257 |
| 3,800,825 | 4/1974 | Zoll | 251/322 X |
| 4,784,174 | 11/1988 | Ryan | 251/144 X |
| 5,123,627 | 6/1992 | Hodges | 251/146 |

FOREIGN PATENT DOCUMENTS

| | | |
|---|---|---|
| GM 7117421 | 5/1971 | Germany . |
| 84 33993 | 12/1984 | Germany . |
| 41 28 818 A1 | 5/1993 | Germany . |
| 41 38608 | 5/1993 | Germany . |

OTHER PUBLICATIONS

Abstract for DE 4138608.
Abstract for DE 8433993.
Abstract for DE 4128818.

*Primary Examiner*—Kevin Lee
*Attorney, Agent, or Firm*—Bachman & LaPointe, P.C.

[57] ABSTRACT

A new and improved drain valve for use with plastic fluid flow components, such as pipes, conduits, fittings, joints and the like is provided. The drain valves include a thermoplastic housing which is directly attached by welding or heat-fusion bonding to a plastic line component or is molded in during the molding step for making the line component. Valving members are assembled to the plastic housing to provide for selective drainage of the plastic line components as desired. The new and improved drain valves permit incorporation of drain valves into plastic conduits and fluid flow systems in a sealed and secure manner substantially in the absence of secondary sealing members.

18 Claims, 3 Drawing Sheets

DRAIN VALVE

BACKGROUND OF THE INVENTION

The present invention generally relates to fluid flow systems, such as water lines, in which water is conveyed through various plastic pipes or conduits and connecting components. More particularly, it relates to a new and improved drain valve connectible to a pipe or other line component for draining the interior passageways or conveying portions of the pipes or line components of a fluid flow circuit.

Drain valves of metal are known. Typically, metal drain valves are connected to a plastic line component by a threaded connection. To that end, an insert of metal must first be slipped onto a pipe connection part of the line component part and must be firmly joined thereto, for example with a clamped connection. The insert comprises a connecting thread into which the valve is screwed. Secondary sealing elements such as rubber O-rings and the like are employed at the sealing locations. These seal elements have a limited service life.

An object of the present invention is to create a drain valve for fluid flow lines, particularly water lines, made of plastic that requires fewer connection locations and, thus, requires fewer seals and also provides a long service life.

SUMMARY OF THE INVENTION

In accordance with these and other objects, the present invention provides a new and improved drain valve for draining thermoplastic fluid flow conduits and systems. More particularly, the new and improved drain valve in accordance with the present invention comprises an elongate thermoplastic polymer valve housing including a first end with an opening and an opposed second end with an opening. A conduit connection portion is defined in the valve housing which extends from the first end to a point intermediate the length of the valve housing. A valve mounting portion is provided extending from the conduit connection portion to the second end of the housing. A longitudinally extending stepped interior passageway extends from the opening in the first end to the opening in the second end. An intermediate step shoulder is defined in the interior passageway in a manner which provides a bearing surface facing the first end opening within the passageway. A drain channel is provided in the housing and extends in the valve mounting portion of the housing in a manner which intersects the passageway between the intermediate step shoulder and the second end of the housing.

The new and improved drain valve also comprises a valve member including a piston portion having a sealing surface and a rod portion. The valve member is mounted for reciprocal movement in the housing passageway. The valve member is movable between a normally closed position, wherein the sealing surface on the piston portion is sealingly engaged against the bearing surface, and an open position, wherein the sealing surface is spaced from the bearing surface, which permits fluid contents to flow past the piston portion along the passageway to drain or exit through the drain channel provided in the valve housing.

In accordance with the present invention, the conduit connection portion of the valve housing is configured and adapted to provide a sealed and fused non-threaded engagement with the thermoplastic fluid flow conduit in the substantial absence of separate secondary sealing members such as O-ring seals. In accordance with the preferred embodiment, the thermoplastic fluid flow conduit has a generally hexagonal cross-sectional configuration and the exterior configuration of the conduit connection portion of the valve housing also is provided with a generally hexagonal configuration.

In accordance with the present invention, the hexagonal conduit connection portion of the valve housing may be press-fit into the hexagonal end of a thermoplastic fluid flow conduit in a telescoping manner and heat-fusion bonded or welded in place to securely affix the valve housing to the fluid flow conduit in a sealed manner.

In accordance with alternate embodiments of the invention, a three-way line component including a previously installed, heat-fused drainage valve may be provided which is useful as is, as a line component, or may be connectible directly in-line into a larger fluid flow conduit of a fluid flow system.

Methods for making the drain valve and for making line components incorporating the drain valve are also provided.

A major advantage provided by the present invention is that drainage valves may now be incorporated directly into plastic line components and subsequently heat-fused or welded in place to add a drain valve to a fluid flow conduit.

In accordance with an alternate embodiment of the present invention, fluid flow conduits may be molded to include the new and improved drain valve housing therein in the form of a unitary molding. The valving elements may be attached directly to the unitary molding to provide line components including drainage valves requiring fewer parts and a reduction in the number of secondary seals required to obtain a fluid-tight line component equipped with a drain.

Other objects and advantages of the present invention will become apparent from the following Detailed Description taken in conjunction with the Drawings in which:

DETAILED DESCRIPTION OF THE PREFERRED EMBODIMENTS

Figure 1:
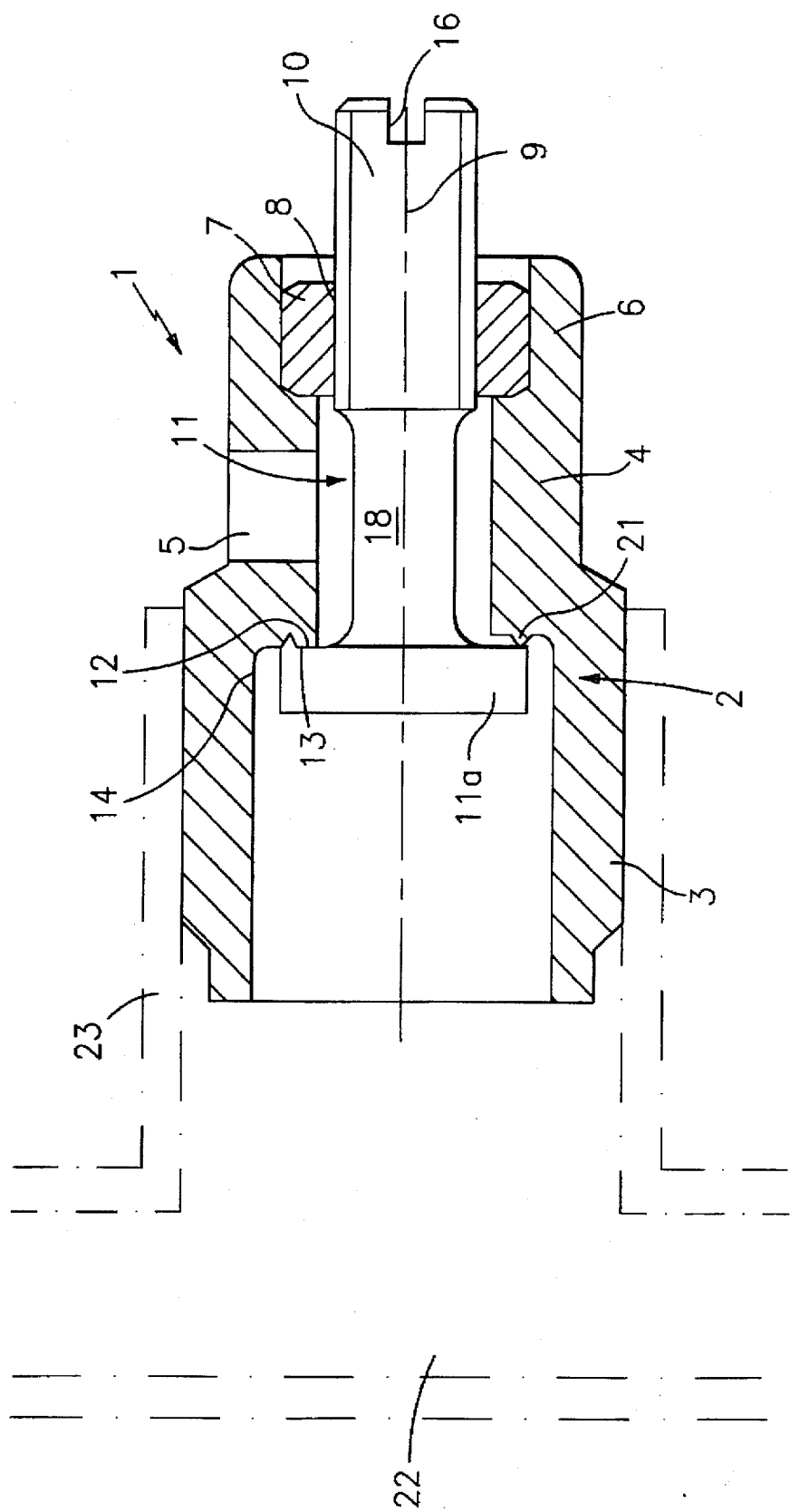
FIG. 1 is an elevated cross-sectional view of the new and improved drainage valve in accordance with a preferred embodiment of the present invention, shown in a heat-fusion bonded, installed position within a plastic fluid flow line component indicated in phantom lines.

FIG. 1 shows a drain valve 1 for draining water conduits of a service water installation. The housing 2 of the drain valve 1 is composed of a thermoplastic polymer. At one end of the drain valve, the housing 2 is fashioned with a conduit connection portion in the form of a weldable or heat fusible hexagonal nipple 3 by means of which the drain valve 1 is welded to a line component part of a plastic conduit 22. The hexagonal connector portion 3 is designed at its outside diameter so that it can be placed into a hollow tubing extension or connection piece 23 of the line component part 22 having a generally T-shaped joint configuration. The line component part 22 can be fashioned, for example, as a machined part, preformed part, as a shut-off device, as a distributor or as a conduit pipe.

The conduit connection portion 3 of drain valve 1 may be heat fused, bonded or welded or joined to the line component part 23 by, for example, heated tool welding. In accordance with this method, either the external surfaces of the conduit connector portion 3 or the end of the tubing connector piece 23, or both, may be heated with a heated tool, then the parts are quickly moved to a desired assembled position and bonding pressure is applied, with or without additional heating to bond and fuse the tubing 23 and connection portion 3 of the valve housing together. Alternatively, connector portion 3 or the connection piece 23 can be equipped with an electrical winding (not shown) in order to join the two parts by resistance welding. The drain valve 1 can also be fashioned such that it can be put in place not in but over the end of connection piece 23 of the line component part 22. A heated tool welding or resistance welding can thereby also ensue. Other heating methods for fusing, bonding and joining polymer parts together including ultrasonic welding may also be used.

A hollow-cylindrical valve mounting section 4 whose inside diameter is smaller than that of the conduit connection portion 3 adjoins the connector portion 3. The outside diameter can likewise be smaller in this region. A drain opening or channel 5 is arranged approximately in the middle of the section 4. A pipe connection (not shown) that indicates the mounting position in downward direction can be arranged thereat. A threaded piece or mounting insert 7 is firmly joined to the housing 2 at the inside in the rear end region 6 of the section 4, the inside thread 8 thereof lying coaxially with the longitudinal axis 9 of the drain valve. The threaded piece 7 is preferably composed of metal and can be a commercially available nut. A valve member 11, preferably of metal, has its threaded part 10 running in the thread 8 thereof. Valve member 11 includes a piston portion 11a with a sealing surface 12 and a rod portion 18. The piston portion 11a is shown in its normal, closed position with its sealing surface 12 pointing toward the rod 18 in sealing engagement with the bearing surface 13 of the housing 2.

An annular projection 14 that comprises a triangular cross-section is arranged close to the circumference at the sealing face 12 of the piston portion 11a. The water flow is blocked when the projection 14 presses against the bearing surface 13 of the plastic housing 2 or, respectively, engages thereinto. An alternative embodiment of the valve seal is shown in the lower half of FIG. 1. As depicted therein, an annular projection 21 having a triangular cross-section is arranged therein at the bearing surface 13 of the housing. When the planar piston sealing surface 12 presses against the bearing surface 13, the projection 21 which acts as a line seal and the drain valve is closed. Additional secondary seal elements, such as O-rings, may be dispensed with due to the geometrical shaping and the pairing of materials. For example, the piston portion 11a can be composed of a harder material than the bearing surface 13 of the housing. A suitable pairing of materials, for example, is metal for the piston portion 11a and plastic for the housing bearing surface 13.

The drain valve 1 is closed in the position shown in FIG. 1. The drain valve 1 can be brought into the open position by turning the spindle or rod 11 with the assistance of a screwdriver that can be introduced into the slot 16 in the threaded part 10. Instead of the slot 16, the spindle 18 can also comprise some other head geometry in order to apply a tool for actuating the spindle 11; for example, a square or two parallel surfaces at the circumference can be provided for an open-end wrench. There is also the possibility of arranging a part, for example a T-bar lever or a handwheel, directly on the spindle 18 in order to be able to actuate the spindle without a tool. In the open position, the water flows past the piston portion 11a, then into the inside bore of the middle section 4 of the valve and then out through the discharge aperture 5.

Figure 2:
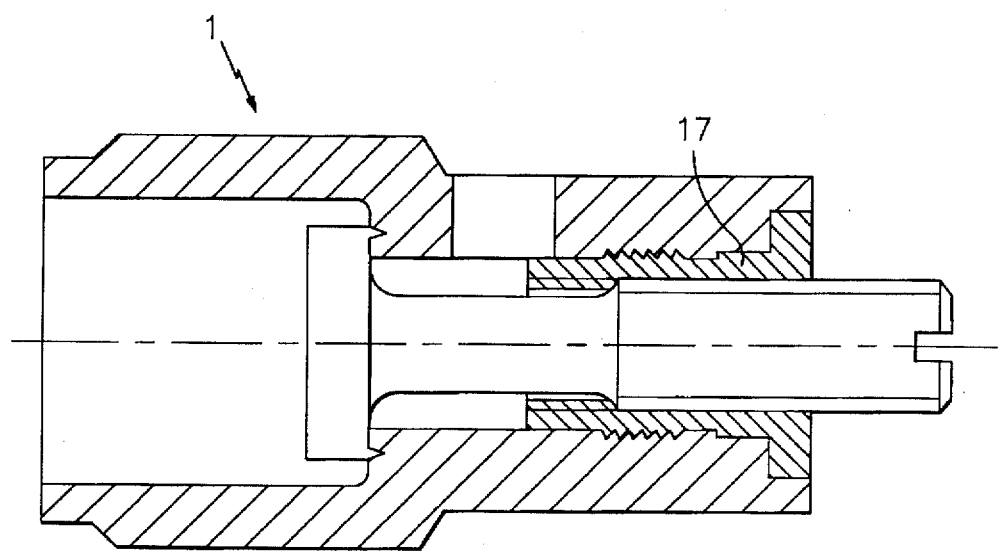
FIG. 2 is an elevated cross-sectional view of a new and improved drainage valve in accordance with an alternate embodiment of the invention.

FIG. 2 shows an alternate embodiment of the drain valve 1 having a different thread part. In this embodiment, a threaded mounting sleeve insert 17 is threadedly engaged in the passageway within the second end of valve housing 2. Valving rod 18 is threadedly, rotatably received in mounting insert 17. As a result thereof, this version can be more compactly fashioned.

Figure 3:
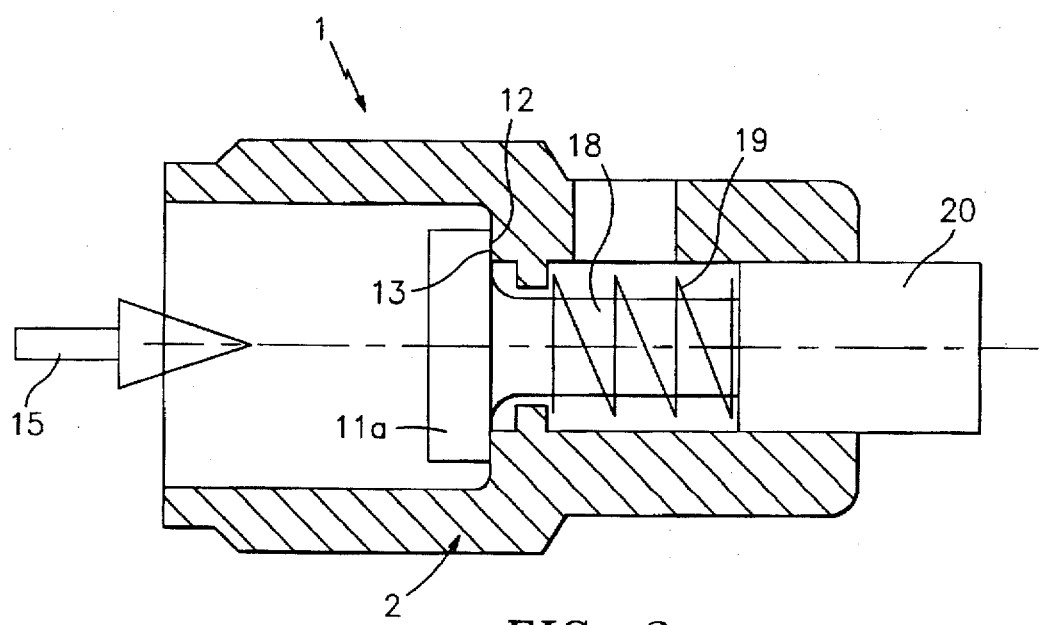
FIG. 3 is an elevated cross-sectional view of a new and improved drainage valve in accordance with still another embodiment of the invention.

FIG. 3 shows still a further embodiment of the drain valve 1 having a compression spring arrangement. The piston portion 11a and the valve rod or shaft 18 are seated and axially displaceable in the housing 2 by a piston slide 20. A compression spring 19 lies between shaft 18 and housing 2. The compression spring 19 is arranged such that it presses the piston portion 11a against the bearing surface 13 of the housing 2. In this embodiment, the piston face 12 lies against the flat bearing face 13 of the housing 2. In addition to the spring, the line pressure of the water or other fluid agent indicated by arrow 15, promotes the tight closure of the sealing surface 12 on piston portion 11a against the bearing surface 13 of the housing 2. Pressing against the outer end of the piston slide 20 is effective to move the piston portion to a spaced and open condition for emptying the water conduit 22. A tool is not required for this purpose in order to actuate or operate the drain valve.

Figure 4:
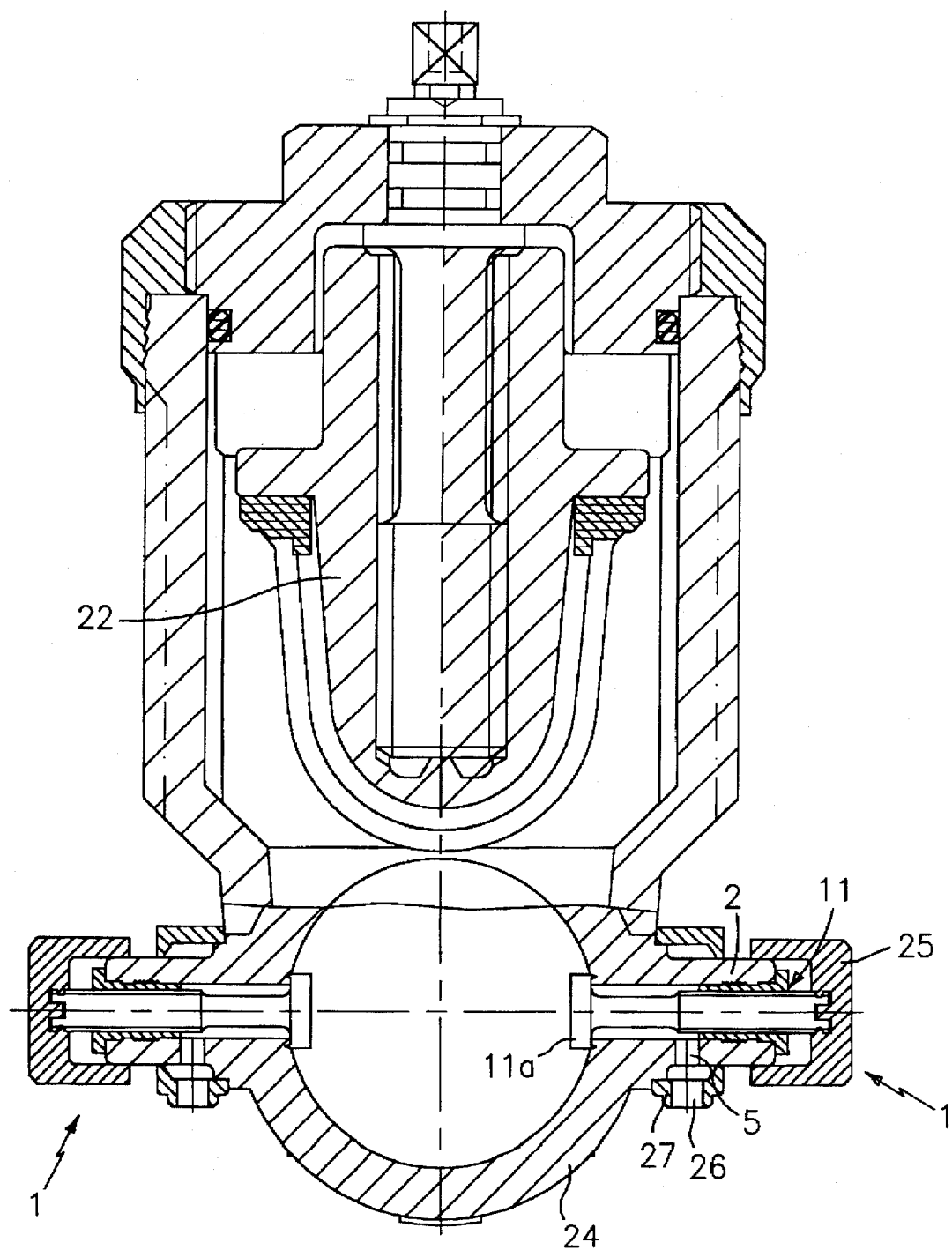
FIG. 4 is an elevated cross-sectional view of a slide stop valve incorporating a line component member including a pair of integrally molded drainage valves in accordance with the teachings of the present invention.

FIG. 4 shows another embodiment and application of the drain valve. The line component part 22 is part of a stop slide valve, for example the inlet or outlet connection piece thereof. The housing 2 of the drain valve 1 is integrated in, i.e., unitarily molded into the housing 24 of the stop slide valve 22. The discharge aperture 5 points in different directions dependent on the installed attitude of the stop slide valve. So that the water flows off in the desired direction when the piston portion 11a is opened, a ring 27 is pressed on over the discharge aperture 5 upon formation of an annular channel having a further discharge aperture 26 which can be positioned independently of the position of the discharge aperture 5. A handwheel 25 is arranged at the head of the spindle 18 for opening the piston portion 11a. The further fashioning of the valve has already been set forth above. Two molded-in drain valves 1 are arranged lying opposite one another at the stop slide valve 22, so that at least one drain valve can be actuated in every installed attitude.

In heat-fused condition, a fluid-tight bond should be provided between the line component and valve housing 2. These parts should be selected from compatible heat-fusible thermoplastic polymeric materials and usually may be selected from the same type of polymer, although each may independently include modifiers or additives. The modulus of elasticity of the line component and housing 2 may be the same or different. Illustrative polymers for forming conduit section 23 and valve housing 2 may include polyvinyl chloride, polyolefin polymers and copolymers, especially polypropylene, polyesters, polyamides and the like. The line component may comprise rigid or flexible PVC conduit and the housing may be plasticized, impact modified or elastomerized PVC or another compatible, i.e., weldable or heat-fusible polymer material. Heat-fusion bonding may usually be accomplished at localized heating temperatures conventionally employed for thermally welding parts formed from the selected thermoplastic materials, although any temperature effective to cause softening and melt fusion behavior of the surfaces to be bonded and sealed together may be used.

Although the present invention has been described with reference to certain preferred embodiments, modifications or changes may be made therein by those skilled in the art without departing from the scope and spirit of the present invention as defined by the appended claims.

What is claimed is:

1. A drain valve for draining a thermoplastic polymer fluid flow line component, said drain valve comprising:

an elongate thermoplastic polymer valve housing including a first end with an opening and an opposed second end with an opening, a conduit connection portion extending from the first end to a point intermediate the length of the valve housing and a valve mounting portion extending from the conduit connection portion to the second end, a longitudinally extending stepped interior passageway extending from the opening in the first end to the opening in the second end having an intermediate step shoulder therein defining a bearing surface facing the first end opening, a drain channel defined in the valve mounting portion of the housing and intersecting the passageway between the intermediate step shoulder and the second end, and a valve member including a piston portion having a sealing surface and a rod portion mounted for reciprocal movement in said passageway and movable between a normally closed position wherein the sealing surface on the piston portion is sealingly engaged against the bearing surface and an open position wherein said sealing surface is spaced from the bearing surface, the conduit connection portion being configured to provide a sealed and fused non-threaded engagement with the thermoplastic fluid flow line component.

2. A drain valve as defined in claim 1, wherein the valve housing is unitarily molded and defined in the fluid flow line component.

3. A drain valve as defined in claim 1, wherein said valve housing comprises a thermoplastic polymer material heat fusible or weldable to a thermoplastic fluid flow line component.

4. A drain valve as defined in claim 1, wherein said bearing surface includes a raised annular ridge for making a line seal with the sealing surface in said closed position.

5. A drain valve as defined in claim 1, wherein said sealing surface includes a raised annular projection for making a line seal with the bearing surface in said closed position.

6. A drain valve as defined in claim 5, wherein said raised annular projection has a triangular cross-sectional configuration.

7. A drain valve as defined in claim 1, wherein said sealing surface includes a raised triangular annular projection and said bearing surface includes a complementary V-shaped annular groove and the annular projection is wedgingly, sealingly received in said annular groove in the closed position.

8. A drain valve as defined in claim 1, wherein said valve housing is a unitary thermoplastic polymer molding.

9. A drain valve as defined in claim 1, said conduit connection portion has a hexagonal configuration.

10. A drain valve as defined in claim 1, wherein said passageway is substantially linear.

11. A drain valve as defined in claim 1, wherein said drain channel intersects the passageway in a substantially perpendicular manner.

12. A drain valve as defined in claim 1, wherein the valve member is maintained in its normally closed position by a compression spring.

13. A drain valve as defined in claim 1, further comprising a mounting insert fixedly received in the opening in the second end and said rod portion is rotatably and threadedly received in said mounting insert whereby rotation of the rod portion with respect to the mounting insert and housing is effective to move the valve member between said closed and open positions.

14. A drain valve as defined in claim 1, wherein the valve member moves in accordance with a flow direction through the valve as the valve member is moved from the open position to the closed position.

15. A drain valve as defined in claim 1, wherein a modulus of elasticity of the thermoplastic polymer valve housing and the piston portion are substantially the same.

16. A drain valve as defined in claim 1, wherein a modulus of elasticity of the thermoplastic polymer valve housing and the piston portion are different.

17. A method for making a drain valve comprising:

molding a one-piece valve housing from a moldable thermoplastic polymer composition, said composition being heat fusible or weldable to a polymeric fluid flow conduit in a shaped and molded condition, said valve housing including a first end with an opening and an opposed second end with an opening, a conduit connection portion extending from the first end to a point intermediate the length of the valve housing member and a valve mounting portion extending from the conduit connection portion to the second end, a longitudinally extending stepped interior passageway extending from the opening in the first end to the opening in the second end having an intermediate stepped shoulder therein defining a bearing surface facing the first end opening, a drain channel defined in the valve mounting portion of the housing and intersecting the passageway between the intermediate stepped shoulder and the second end; and mounting a valve member within said valve housing, said valve member including a piston portion having a sealing surface and a rod portion, said valve member being mounted for reciprocal movement in said passageway and being movable between a normally closed position wherein the sealing surface on the piston portion is sealingly engaged against the bearing surface and an open position wherein said sealing surface is spaced from the bearing surface, whereby a drain valve configured and adapted to provide a sealed and fused non-threaded engagement with a thermoplastic fluid flow conduit is provided such that the conduit connection portion of the valve housing may be thermally fused or welded within a thermoplastic fluid flow conduit to provide a sealed connection therewith.

18. A drain valve-containing line component for use in a fluid flow line system comprising:

a three-way line component including a first hollow thermoplastic polymer tubing member having a pair of opposed free ends connectible in-line in a fluid flow system and a second hollow thermoplastic tubing member projecting from said first tubing member at a point intermediate the length thereof and extending from a first connected end to a second opposed free end;

a drain valve heat-fusion bonded within the second free end of the second tubing member, said drain valve comprising an elongate thermoplastic polymer valve housing including a first end with an opening and an opposed second end with an opening; a conduit connection portion extending from the first end to a point intermediate the length of the valve housing disposed in sealed and fused engagement within the second free end of the second thermoplastic tubing member, said valve housing further including a valve mounting portion extending from the conduit connector portion to the second end; a longitudinally-extending stepped interior passageway extending from the opening in the first end to the opening in the second end and having an intermediate stepped shoulder therein defining a bearing surface facing the first end opening, a drain channel defined in the valve mounting portion of the housing and intersecting the passageway between the intermediate stepped shoulder and the second end; and a valve member including a piston portion having a sealing surface and a rod portion mounted for reciprocal movement in said passageway and movable between a normally closed position wherein the sealing surface on the piston portion is sealingly engaged against the bearing surface and an open position wherein the sealing surface is spaced from the bearing surface, said three-way line component being connectible in-line in a fluid flow line system to provide a drain valve.

* * * * *